(12) United States Patent
Gerber et al.

(10) Patent No.: US 6,626,246 B2
(45) Date of Patent: Sep. 30, 2003

(54) TILLAGE IMPLEMENT WITH ONE POINT PIN ANGLE ADJUSTMENT

(75) Inventors: Rickey Gerber, Roanoke, IL (US); Dean Knobloch, Goodfield, IL (US); Paul Hurtis, Mackinaw, IL (US); William J. Dietrich, Sr., Goodfield, IL (US)

(73) Assignee: Case, LLC, Racine, WI (US)

( * ) Notice: Subject to any disclaimer, the term of this patent is extended or adjusted under 35 U.S.C. 154(b) by 0 days.

(21) Appl. No.: 09/954,228

(22) Filed: Sep. 17, 2001

(65) Prior Publication Data

US 2002/0144826 A1 Oct. 10, 2002

Related U.S. Application Data (60) Provisional application No. 60/281,638, filed on Apr. 5, 2001.

(51) Int. Cl.[7] .............................................. A01B 63/22
(52) U.S. Cl. ...................................... 172/142; 172/615
(58) Field of Search ................................ 172/620–626, 172/633–635, 643, 142, 707, 706, 705, 739, 615; 56/371

(56) References Cited

U.S. PATENT DOCUMENTS

| | | | |
|---|---|---|---|
| 3,765,159 A | * 10/1973 | Neff | 56/396 |
| 4,088,083 A | 5/1978 | Dall | 111/13 |
| 4,180,005 A | 12/1979 | Zumbahlen | 111/52 |
| 4,212,254 A | 7/1980 | Zumbahlen | 111/52 |
| 4,231,305 A | 11/1980 | Lely | 111/7 |
| 4,479,549 A | 10/1984 | Fegley | 172/142 |
| 4,542,793 A | 9/1985 | Dietrich | 172/180 |
| 4,615,396 A | 10/1986 | Arnold | 172/138 |
| 5,443,127 A | * 8/1995 | Gates | 172/634 |
| 5,474,135 A | 12/1995 | Schlagel | 172/151 |
| 5,492,182 A | * 2/1996 | Delaurier | 172/615 |
| 5,622,227 A | 4/1997 | McDonald | 172/146 |
| 5,622,229 A | * 4/1997 | Degelman | 172/621 |
| 5,797,460 A | 8/1998 | Parker | 172/151 |
| 5,833,011 A | 11/1998 | Boertlein | 172/149 |
| 6,164,386 A | * 12/2000 | Delaurier | 172/622 |

* cited by examiner

Primary Examiner—Robert E. Pezzuto
(74) Attorney, Agent, or Firm—Rebecca Henkel (57) ABSTRACT

A tine harrow assembly includes a frame member; a plurality of tines pivotally connected to the frame member to permit a rake angle adjustment of the tines. The tines are arranged in a plurality of transversely extending rows and an adjustment mechanism operably connects to the tines for effecting a change in the rake angle, where the adjustment mechanism includes a tine slide having a stop formed therein corresponding to each the transverse row of tines. The tine slide being movable relative to the frame to position the stops at one of multiple selected positions, the transverse rows of tines are pivotable against the corresponding stops to define a selected rake angle.

7 Claims, 13 Drawing Sheets

TILLAGE IMPLEMENT WITH ONE POINT PIN ANGLE ADJUSTMENT

RELATED APPLICATION

This application claims the benefit of the filing date of co-pending provisional application 60/281,638, filed Apr. 5, 2001.

FIELD OF INVENTION

The invention relates to soil working implements and, more particularly, relates to a soil working implement having a cultivator and one or more tine harrow sections articulated to the cultivator in a trailing relationship thereto. The invention additionally relates to a soil working implement of the above-mentioned type having a one point tine angle adjustment.

BACKGROUND OF THE INVENTION

A wide variety of tillage implements are used to prepare soil for planting. Some such implements include two or more sections articulated to one another so as to perform multiple functions as they are pulled through fields by a single tractor or other prime mover. One such implement is a cultivator/harrow, which is capable of simultaneously tilling soil and leveling the tilled soil in preparation for planting. This implement includes a cultivator that is towed by a tractor or other prime mover, and a unitary or sectional tine harrow that is towed by the cultivator.

The cultivator includes a plurality of cultivator members or "sweeps" (sometimes known as shanks or chisel plows) that are suspended from a frame and that rip into the soil as the machine is pulled across the ground to till the soil. The sweeps are arranged in transversely extending rows. The sweeps of each row are transversely staggered relative to the sweeps of the adjacent rows. In use, each successive row of sweeps tills part of a strip of soil left untilled by the preceding row. The last row of sweeps tills the last untilled strip of the swath, leaving ridges between the sweeps that are flanked by valleys directly behind the sweeps.

The harrow is designed to level the tilled soil sufficiently to produce a seedbed that is as level as possible and that is relatively clod free. A clod free, level seedbed formed from soil of relatively small particle size is desirable because it facilitates planting to a uniform depth and, accordingly, promotes uniform germination and uniform emergence. The typical harrow includes a plurality of grounded-engaging tines that penetrate the soil tilled by the cultivator. Multiple harrow sections are often provided, each of which spans a proportionate part of the transverse width of the swath tilled by cultivator. The tines are typically arranged in longitudinally extending, transversely spaced rows. They are intended to redirect soil from ridges or windrows left by the cultivator sweeps into the adjacent valleys, hence leveling the tilled surface. The tines, and/or related equipment such as rotating baskets, also firm the soil and break up clods.

Some harrows incorporate measures to permit rake angle adjustment. The "rake angle" is the angle of inclination of the tine relative to ground. The rake angle of some harrows can be adjusted to adjust the force imposed on the ground by the tines in order to maintain a particular penetration-depth in different soil conditions or to set a new penetration depth for a particular soil condition.

However, tine rake angle adjustment typically requires the use of specialized tools and sometimes requires tine angle adjustment on a tine-by-tine basis. Considerable operator time and effort are required to make rank angle adjustments in these systems. Moreover, known mechanisms for adjusting rake angle do not assure that the rake angles of all tines will be altered uniformly. Undesirable variations of rake angle within a cultivator section often result.

The need therefore has arisen to provide a harrow having a rake angle that can be rapidly adjusted in the field without any specialized tools.

The need has also arisen to provide a rake angle adjuster for a harrow that assures that any rake angle adjustment imparts a uniform change in rake angle to all tines of a harrow section.

SUMMARY OF THE INVENTION

It is an object of the invention to avoid this disadvantages of the prior art by providing rake angle adjustment for a harrow that assures rake angle adjustment imparts a uniform change in the rake angle to all tines of a harrow section.

In accordance with the first embodiment of this invention, a tine harrow assembly including a frame member; plurality of tines pivotally connected to the frame member to permit a rake angle adjustment of the tines. The tines are arranged in a plurality of transversly extending rows. The adjustment mechanism is operably connected to the tines for effecting change in the rake angle. The adjustment mechanism includes a tine slide having a stop formed therein corresponding to each of the transverse row of tines. The tine slide being movable relative to the frame to position the stops at one of multiple selected positions. The transverse rows of tines being pivotable against the corresponding stops to define a selected rake angle. The cultivator section includes a plurality of transversely spaced cultivator members.

The tine slide may include a slide plate slidably mounted on a longitudinally-extending support member of the harrow assembly. The side plate is attached to the support member at any one of multiple mounting points along the support member. The number of mounting points equals the number of stop positions.

The side plate may include an access point for applying actuating forces to the side plate.

The access point may include a manually-accessible handle.

The stops may be formed integrally with the slide plate.

The tine harrow assembly may include a tensioner that is coupled to the tine slide and to support the frame member and that tensions the tine harrow assembly downwardly and forwardly.

The support may include a multiple tensioner attachment points corresponding in number to the number of stop positions. The tension is movable between the attachment points to maintain application of a generally constant tensioning force against the harrow assembly regardless of tine slide position.

The support may include a hitch of a harrow of which the tine harrow assembly is a part.

In accordance with a second embodiment of the invention, a method of adjusting a rake angle of a tine harrow assembly which includes a frame member and a plurality of tines pivotally connected to the frame member to permit a rake angle adjustment of the tines; the tines are arranged in a plurality of transversly extending rows, where the method includes the steps of moving a tine slide longitudinally of the frame member while simultaneously pivoting all of the rows of tines to maintain an abutting relationship between the rows of tines and a corresponding number of longitudinally spaced stops on the tine slide.

The method may further include the step of detaching the tine slide from the frame member prior to the moving step and reattaching the tine slide to the frame member after the moving step.

These and other features and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF PREFERRED EMBODIMENTS

Figure 1:
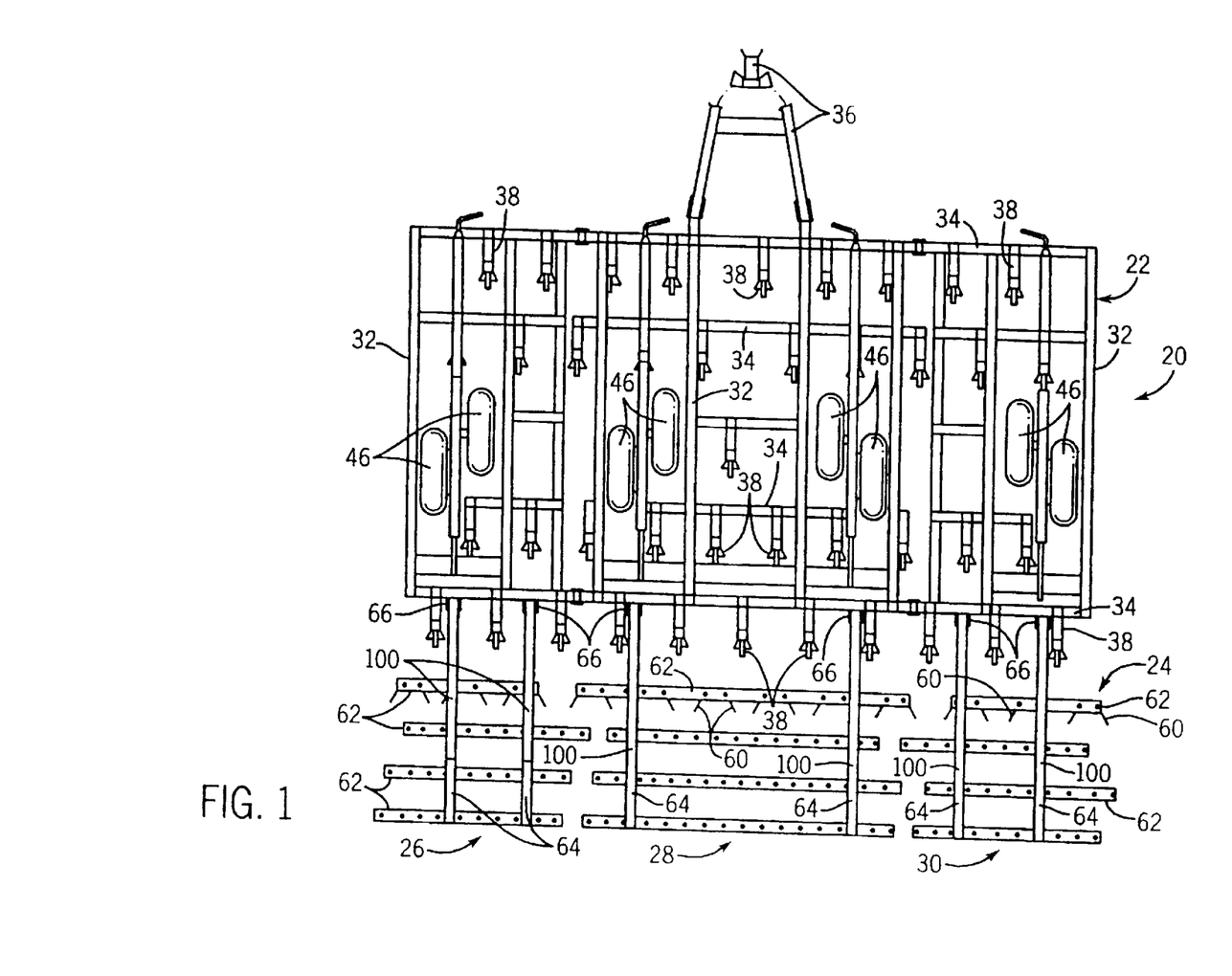
FIG. 1 is a top plan view of a soil working implement constructed in accordance with a first preferred embodiment of the invention.
Figure 2:
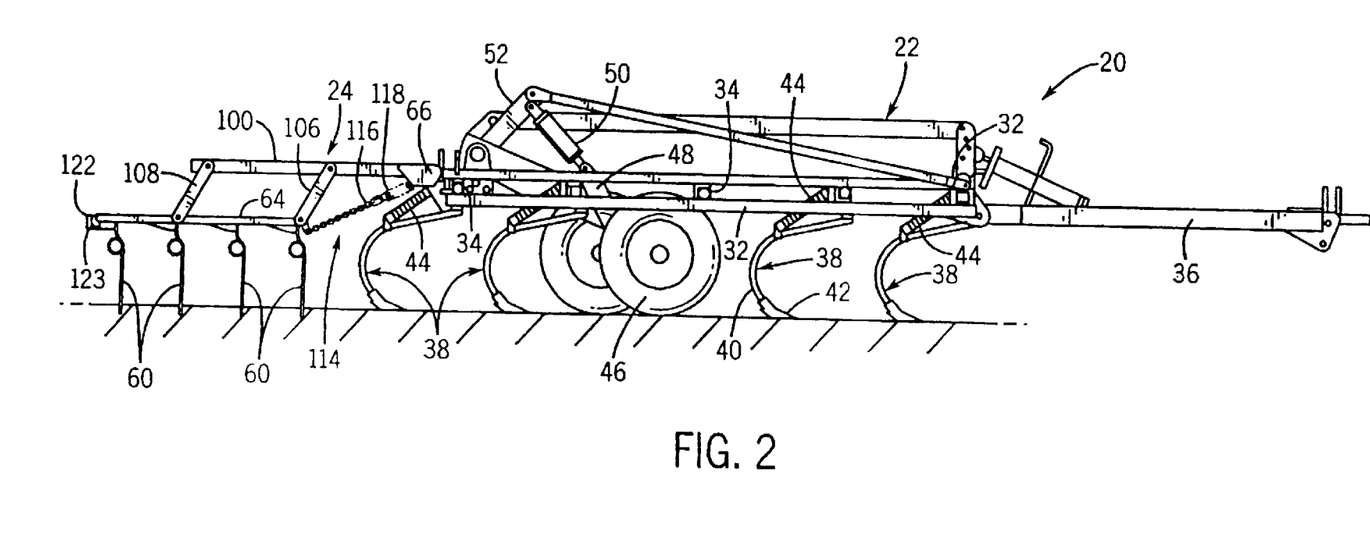
FIG. 2 is a side elevation view of the implement of FIG. 1.

Referring now to the drawings and initially to FIGS. 1 and 2 in particular, a ground working implement 20 constructed in accordance with a first preferred embodiment of the present invention includes a cultivator 22 and a harrow 24 articulated to one another in an end-to-end fashion. The cultivator 22 is configured to be towed by a tractor or other prime mover so as to till the soil over which the implement 20 travels. The harrow 24 is towed by the cultivator 22 and is configured to level windrows or ridges left by the cultivator 22. The harrow 24 preferably takes the form of a plurality (3 in the illustrated embodiment) of harrow sections 26, 28, 30 independently articulated to the back of the cultivator 22. The center harrow section 28 of the illustrated embodiment is wider than the two flanking end sections 26 and 30. However, different numbers of harrow sections of different relative widths, or even a single harrow section spanning the width of the swath tilled by the cultivator 22, could be provided if desired.

Figure 3:
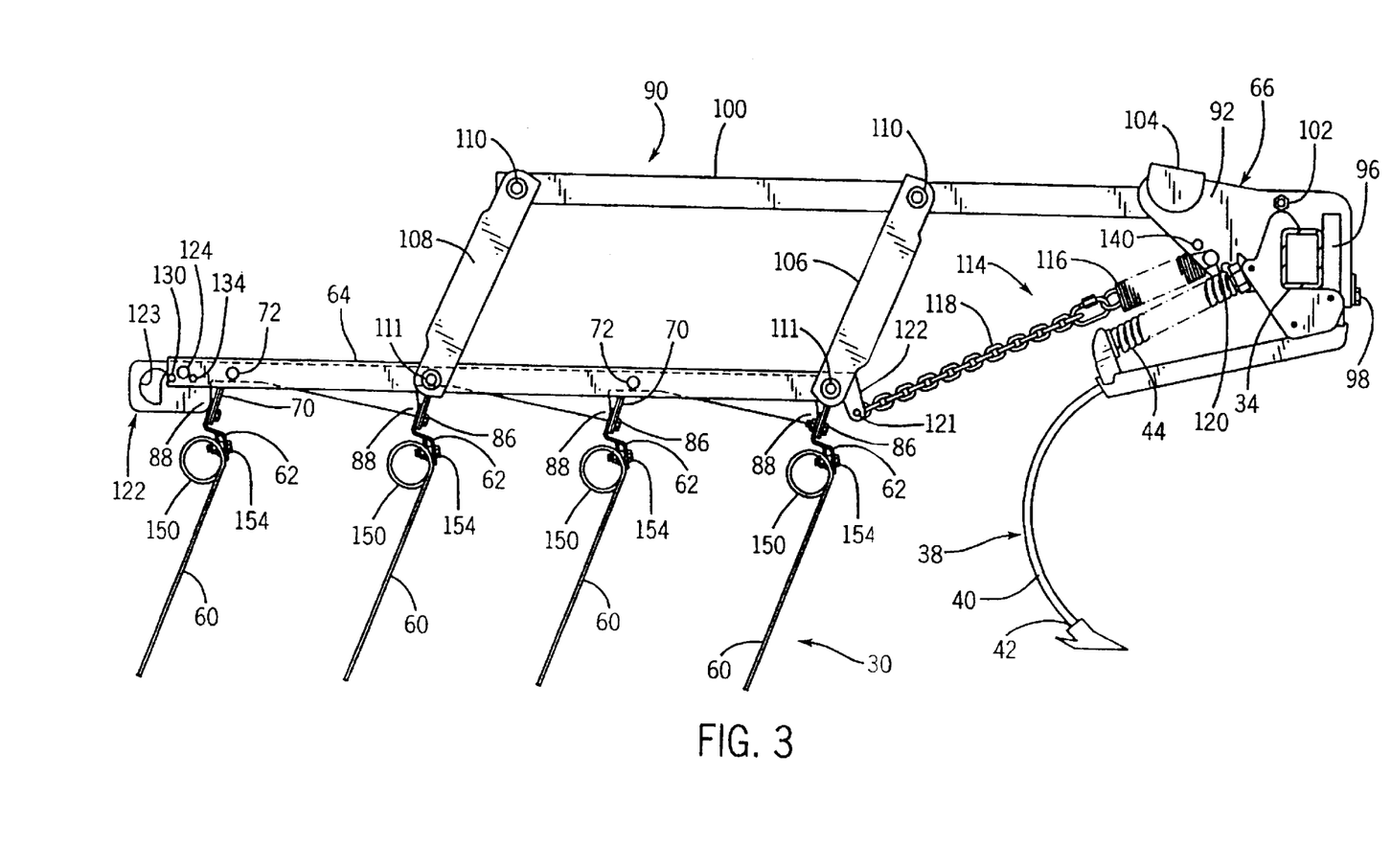
FIG. 3 is a side elevation view of a harrow of the implement of FIG. 1.

The cultivator 22 is conventional. It includes a frame formed from longitudinal tubular beams 32 and transverse tubular beams 34, a hitch 36 that couples the frame to a prime mover, and a plurality of cultivator members in the form of shank assembly 38 or plows that extend downwardly from the transverse beams 34 to the ground. As best seen in FIGS. 2 and 3, each shank assembly 38 includes a curved arm 40 mounted on the associated transverse beam 34 and a sweep 42 mounted on the bottom end of the arm 40. The arms 40 are pivotally mounted on the transverse beams 34 and are biased to the rearward-most positions thereof by springs 44. A plurality of wheels 46 are mounted on arms 48 that are pivotable with respect to the frame. The arms 48 are coupled to a hydraulic cylinder 50 by a suitable linkage 52 that raises and lowers the arms 48 upon cylinder extension and retraction. The wheels 46 therefore can be raised from their illustrated, lowermost position to either 1) a partially raised position to reduce the penetration depth of the shank assembly 38 or 2) a fully raised position for transport.

The shank assembly 38 of successive rows of the illustrated cultivator 22 are indexed relative to the lines of travel of the sweeps of the remaining rows to effect a so-called "split the middle" sweep pattern, which allows for uniform ridges to be formed. The shank assembly 38 ahead of the rear two rows of sweeps take a full cut and leave alternating strips of untilled soil. The shank assembly 38 of the two rear rows till the untilled strips left by the forward sweeps. Specifically, the sweeps in the next to last row till one half of the width of the remaining untilled strips and take out the middle of the ridges left by the sweeps in the row directly in front of that row. The shank assembly 38 of the rear row till the other half of the untilled strips and fill the grooves left by the next to last row of sweeps and take out the middle of the ridge left by the sweeps of the third row, resulting in a groove behind each of the shank assembly 38 of the rear row and a ridge adjacent each groove.

Except for being of different widths, the harrow sections 26, 28, 30 are identical to one another. The following description of harrow section 30 therefore applies equally to sections 26 and 28.

Figure 4:
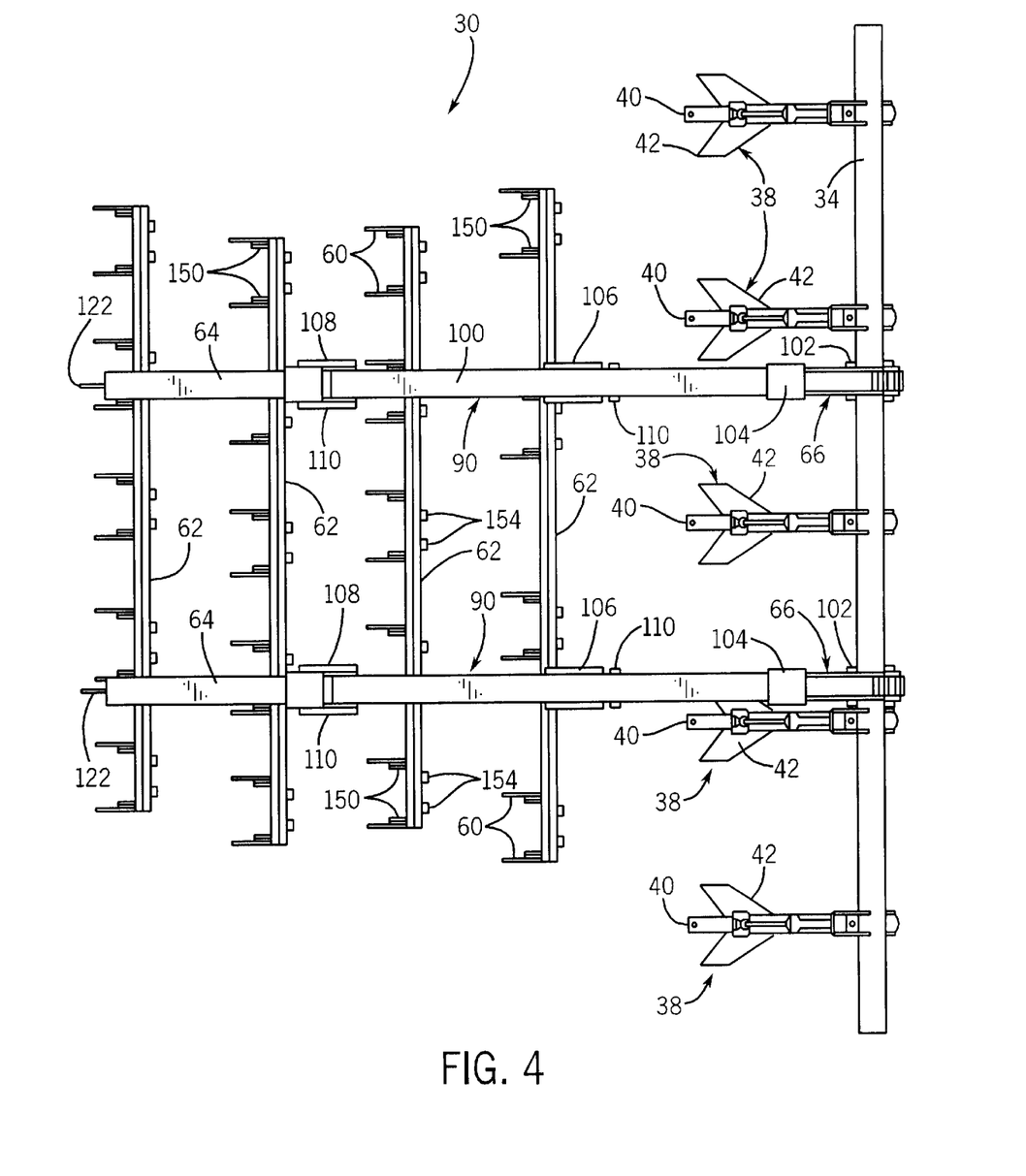
FIG. 4 is a top plan view of a section of the harrow of FIG. 3.
Figure 5:
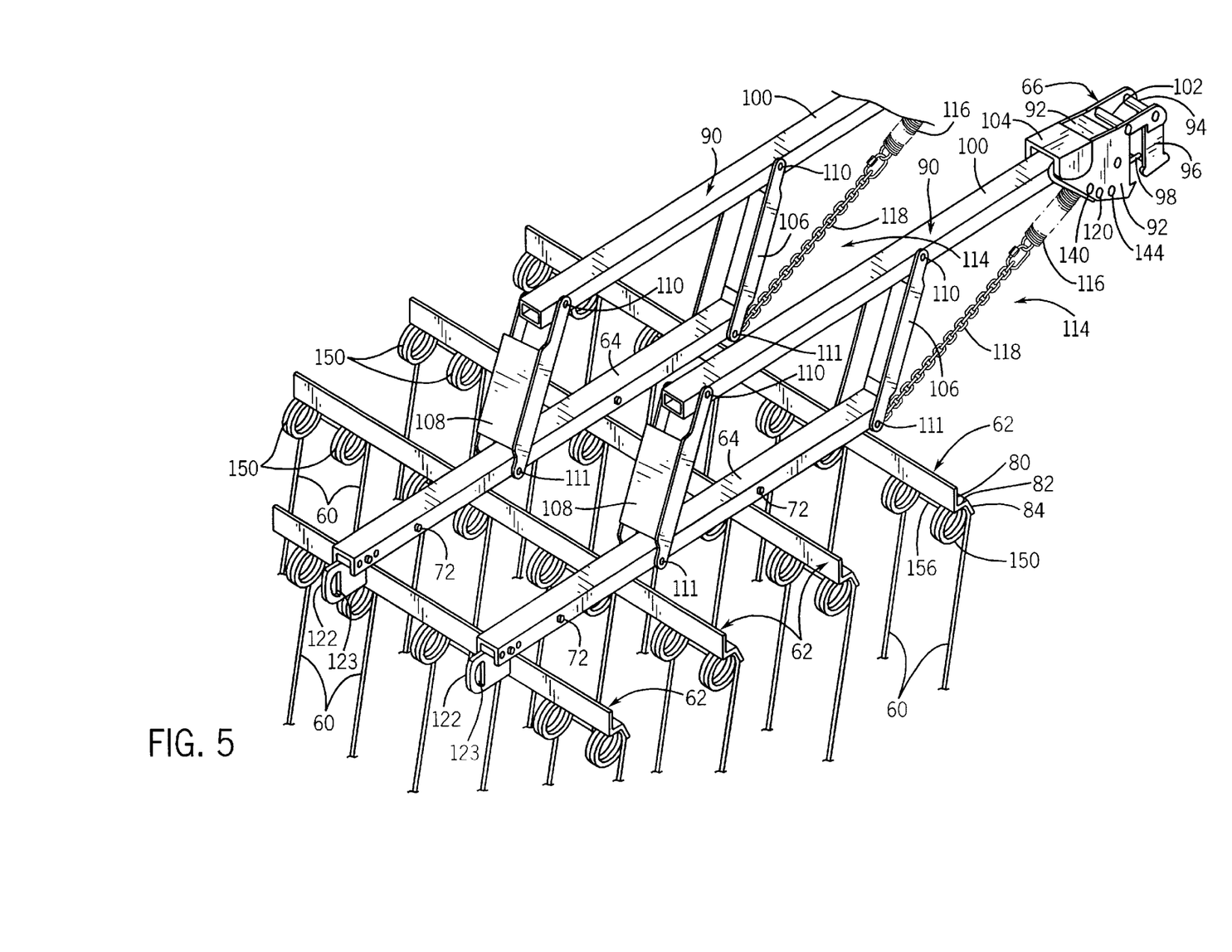
FIG. 5 is a perspective view of the harrow section of FIG. 4, viewed from above the harrow section.

Referring to FIGS. 3–5, harrow section 30 includes at least a plurality of tines 60 and a frame that supports the tines 60. The frame preferably comprises 1) a plurality (4 in the illustrated embodiment) of tine bars 62 that support the tines 60 in longitudinally spaced, transversely extending rows, and 2) a pair of longitudinally extending support arms 64. The frame is coupled to the cultivator by a pair of floating hitch assemblies (discussed in Section 2) below.

Still referring to FIGS. 3–5, each of the support arms 64 extends the full length of the harrow section 30. Each support arm 64 is generally n-shaped when viewed in transverse cross section so as to form a hollow interior that receives a rake angle adjuster slide plate 122 as detailed in Section 3 below.

Figures 6, 7:
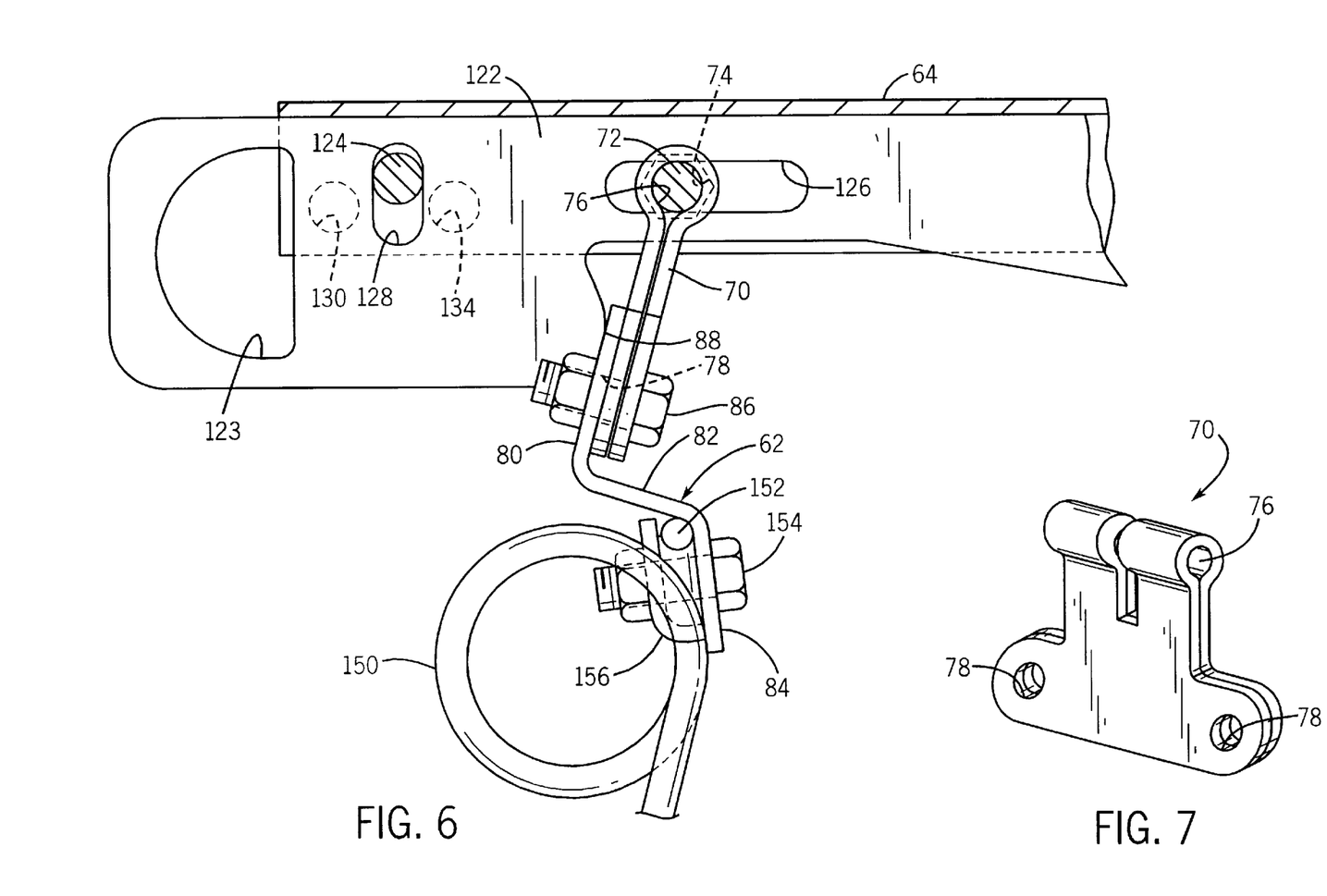
FIG. 6 is a side elevation view of a portion of the harrow section of FIGS. 4 and 5, including a tine bar, a hinge, a portion of one of the tines, a portion of a tine slide, and a portion of one of the support arms.
FIG. 7 is a perspective view of the hinge of FIG. 6.

Referring to FIGS. 6–7, each tine bar 62 is suspended from the associated support arm 64 by a respective hinge 70. The hinge 70 allows for automatic movement of individual rows of tines by permitting the tine bars 62 to pivot forwardly. Each hinge 70 is pivotally suspended from the associated support arm 64 by a hinge pin 72 that extends through opposed holes 74 in the support arm 64 and through a bore 76 in the upper portion of the hinge 70.

The tine bar 62 is generally Z-shaped, having an upper, generally vertical leg 80, a center, generally horizontal leg 82, and a lower, generally vertical leg 84. The upper leg 80 is bolted to mounting holes 78 in the hinges 70 via bolts 86. The lower leg 84 has a plurality of spaced holes for receiving the tines 60. These holes are spaced symmetrically from one another to provide the tine indexing described below. The rear surface of the upper leg 80 normally rests against stops 88 on slide plates 122 (detailed in Section 3 below) to determine the rake angle of the row of tines mounted on the tine bar 62. However, the tine bars 62 are free to pivot forwardly away from the stops 88 to permit forward pivoting movement of each of the tine bars 62 independently of the others upon, e.g., reverse movement of the implement, thereby preventing damage to the tines 60.

Referring now to FIGS. 5 and 6, the tines 60 may comprise any wire or peg-like structures that level the soil as the harrow 24 passes over it. In the illustrated embodiment, the tines 60 are provided as tine assemblies, each of which is formed from a single piece of spring wire. Each tine assembly includes a pair of transversely-spaced, vertically extending tines 60, two coils 150 located at the upper ends of the tines 60, and a transverse portion 152 that connects the coils 150 to one another. The transverse portion 152 also serves as a mount point for mounting each tine assembly on the associated tine bar 62. Specifically, the transverse portion 152 is held in place by a pair of bolts 154 that extend 1) through a bracket 156 located behind the transverse portion 152, 2) beneath the transverse portion 152, and 3) through the indexed and aligned holes in the lower leg 84 of the associated tine bar 62. This arrangement biases the individual tines 60 against the stops 88, but allow the individual tines 60 to resiliently deflect away from the stops 88 upon encountering an obstruction.

The tines 60 are indexed relative to one another and to the line of travel of the last row of shank assembly 38 on the cultivator 22 so as to maximize the leveling capability of the harrow 24. Specifically, the front row of tines 60 is positioned such that they split the middle of the ridges or windrows made by the last row of shank assembly 38. The second row of tines 60 is indexed to the first row so that each tine 60 of the second row splits the middle of ridges or windrows formed between two adjacent tines of the first row. The tines 60 of the third and fourth rows are also offset relative to the tines of the first and second rows and to each other. In the illustrated embodiment, shank assembly 38 leave a substanital ridge between each pair of grooves on 24" centers. The tines 60 of the first row are indexed relative to the line of travel of the last row of shank assembly 38 to split the middle of these ridges. Only two tines are positioned in each line of travel between lines of travel of the shank assembly 38. The first row leaves smaller uniform ridges on 8" centers. The tines 60 of the second row are offset 4" relative to the tines of the first row and are located on 8" centers so as to split the middle of the ridges left by the first row. The tines 60 of the third row are offset 2" from the tines of the second row and are located on the 4" centers to cut a new path. The fourth row is offset 4" from the third row and is arranged to split the ridges left by the third row.

Figure 8:
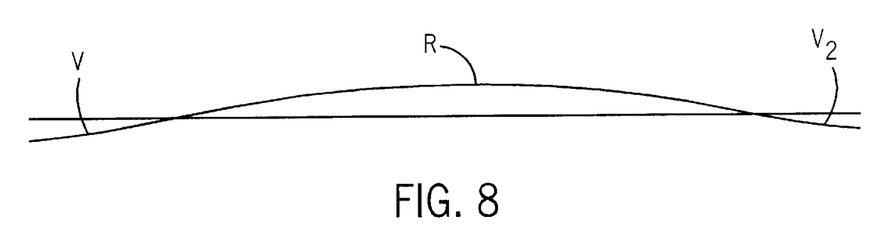
FIGS. 8–10 schematically illustrate the progressive leveling effect achieved during operation of the harrow of FIGS. 1–3.
Figure 9:
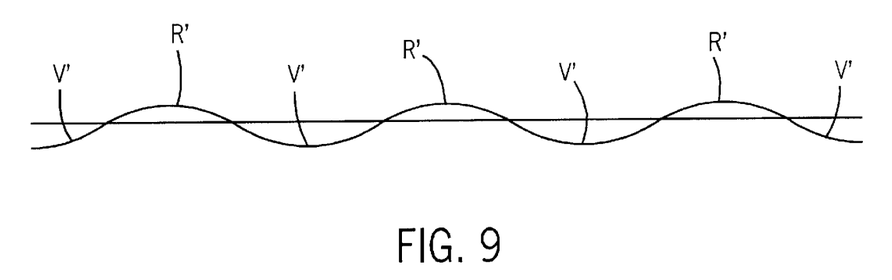
Figure 10:
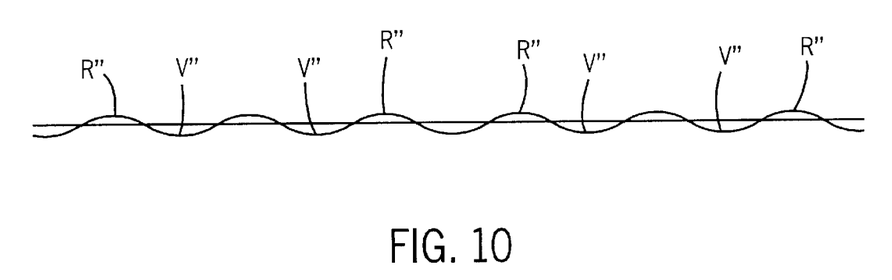

The leveling effect achieved by the tine 60 is illustrated in FIGS. 8–10, which schematically illustrate the idealized profile of a strip of soil having a ridge left between two adjacent shank assembly 38 on the last row of the cultivator 22. FIG. 8 illustrates that the ridge R left by the shank assembly 38 is relatively large and deep and is flanked at both ends by similarly shaped valleys V1 and V2. FIG. 9 illustrates that the first and second rows of tines 60, in combination, break the ridge R of FIG. 8 into three much shallower, narrower ridges R' flanked by smaller, narrower valleys V'. FIG. 10 illustrates that the depths and widths of both the ridges R" and valleys V" are reduced still further after passage of the third and fourth rows of tines 60. A comparison of FIG. 8 and FIG. 9 illustrates that the primary leveling is performed by the first two rows of tines. The tines 60 of the third and fourth rows function primarily to break up clods and to firm the soil.

Figure 11:
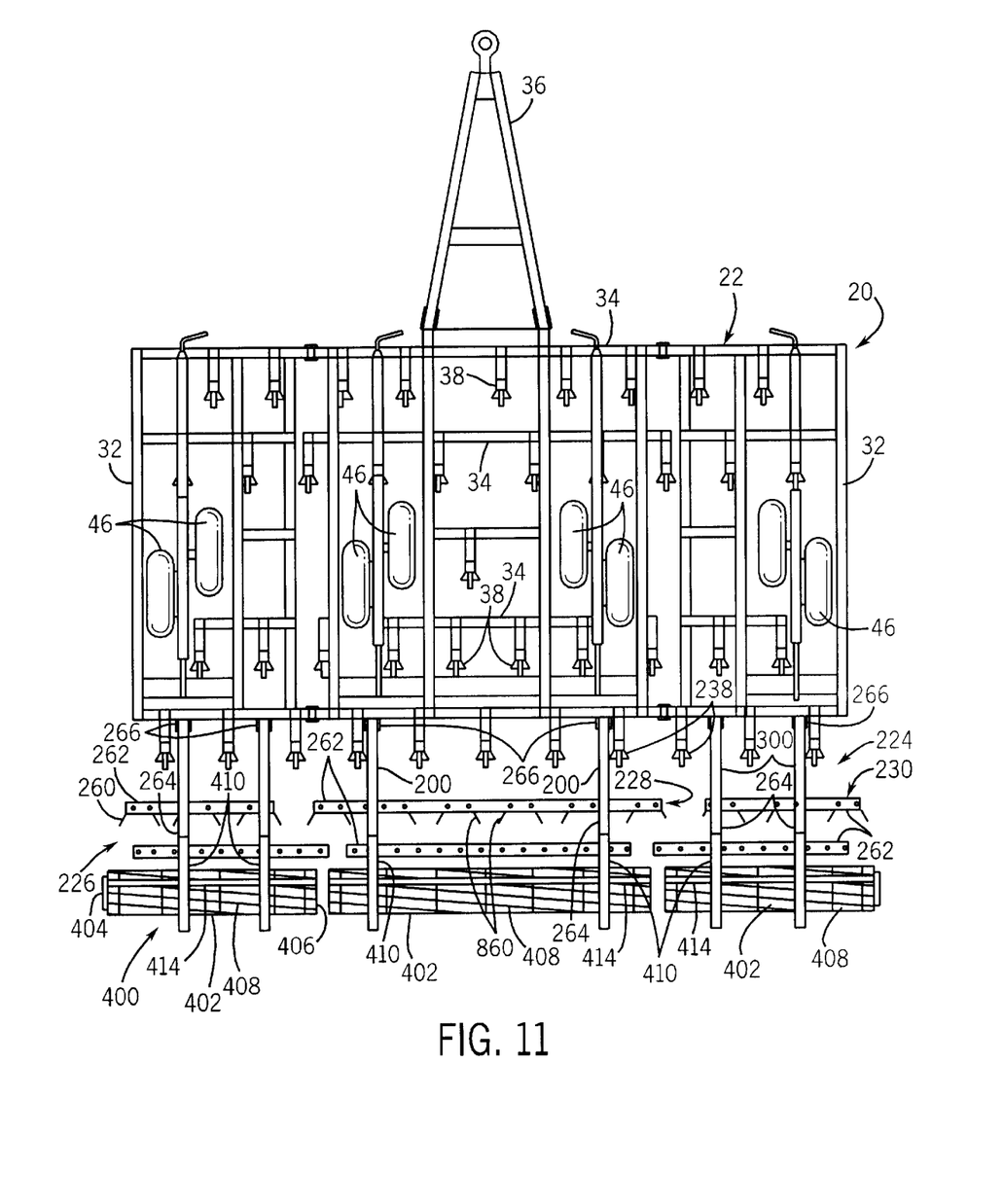
FIG. 11 is a top plan view of a soil working implement constructed in accordance with a second preferred embodiment of the invention.
Figure 12:
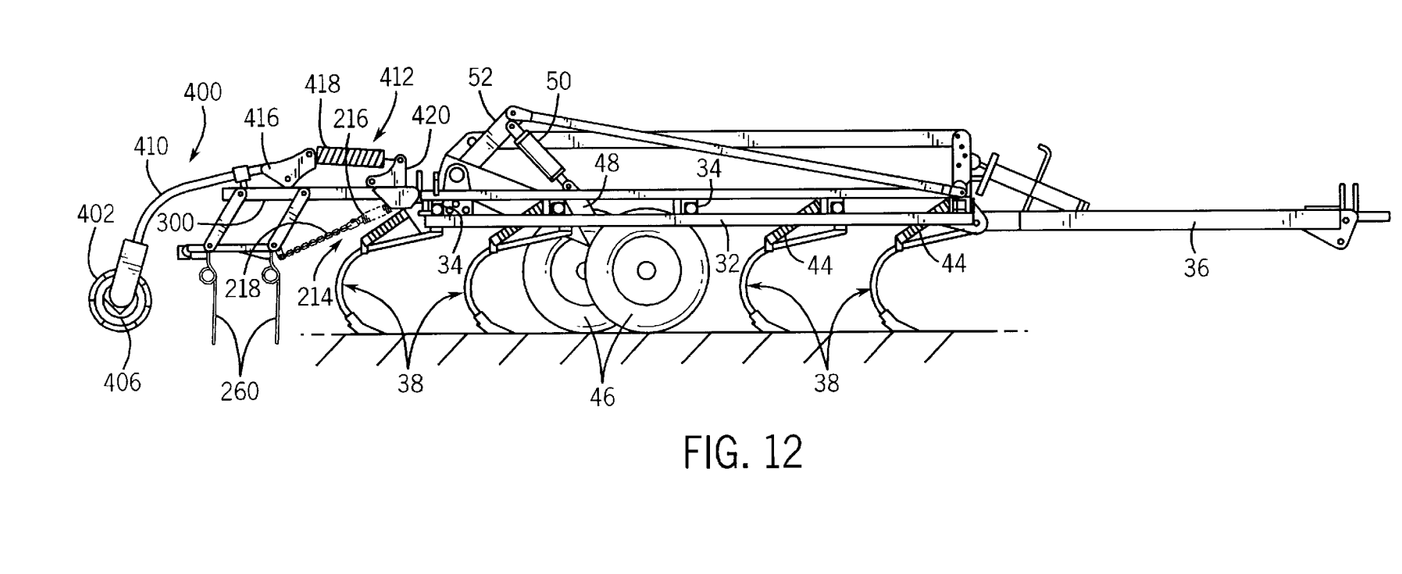
FIG. 12 is a side elevation view of the soil working implement of FIG. 11.

A rotating basket or "rotary firming reel assembly" could perform the firming and clod reduction functions of the last two rows of tines. Referring now to FIGS. 11 and 12, a harrow 224 is illustrated that is identical to the harrow 24 of the first embodiment except for the fact that the last two rows of tines are replaced with a rotary firming reel assembly 400 configured to perform the clod reduction and soil firming function. Elements of the harrow 224 corresponding to elements of the harrow 24 are designated by the same reference numerals, incremented by 200. Harrow 224 therefore includes three harrow sections 226, 228, and 230, each of which comprises a plurality of rows of tines 260 mounted on tine bars 262. The tine bars 262 are supported on support arms 264 coupled to the cultivator 22 by a hitch 266.

Still referring to FIGS. 11 and 12, a preferred rotary firming reel assembly 400 includes a rotating firming reel assembly 402 mounted on spaced brackets 404, 406. Each rotary firming reel assembly 402 may be formed from any structure or combination of structures that engage the ground so as to break up clods and firm the soil without unnecessarily compacting the soil.

The basket 402 of each rotary firming reel assembly 400 is mounted to the associated harrow section 226, 228, 230 via a pair of transversely spaced, longitudinally extending mounting arms 410 and a corresponding pair of coil spring flex systems 412. The lower ends of both mounting arms 410 are connected to a common transverse link 414 that is connected at its ends to the mounting brackets 404, 406. The upper end of each mounting arm 410 is pivotably connected to one end of a plate 416 of the coil spring flex system 412. The plate 416 is generally triangular, being pivotably mounted on an associated tow arm 300 at a central position thereof and having front and rear ends. The upper end of each mounting arm 410 is connected to the rear end of the associated plate 416. A spring 418, connected to the front end of the plate 416 and to a spring support bracket 420 on a tow arm 300, biases the plate 416 and the mounting arm 410 to a position maintaining a firm contact between the crumbler wheel assembly 400 and the ground.

As discussed briefly above, each harrow section is configured to be hitched to the cultivator 22 by a floating hitch arrangement. The floating hitch arrangement permits substantial float of the harrow assembly of that section relative to the cultivator in order to accommodate changes in ground topography. It also maintains a parallel relationship between the harrow assembly and the portion of the harrow that is towed by the cultivator or other towing implement or prime mover. (The harrow assembly of a particular harrow section of the first preferred embodiment comprises the tines 60, the tine bars 62, the support arms 64, and any other structures that move with these structures as a unit). The floating hitch arrangement also is configured to permit each harrow section to pivot relative to the cultivator 22 or other towing implement. The same floating hitch arrangement can be used for both the harrow 24 of the first embodiment and the harrow 24 of the second embodiment. It will therefore be described in conjunction with the first embodiment, it being understood that the discussion applies equally to the second embodiment, and that the hitch arrangement is usable with other types of harrows as well.

While the desired effects could be obtained via a variety of structures, they preferably are obtained via a combination of a floating hitch and a four-bar linkage assembly, preferably a parallelogram linkage assembly 90. Two floating hitches and the associated parallelogram linkage assemblies 90 are preferably provided for each harrow section 26, 28, 30.

Figure 13:
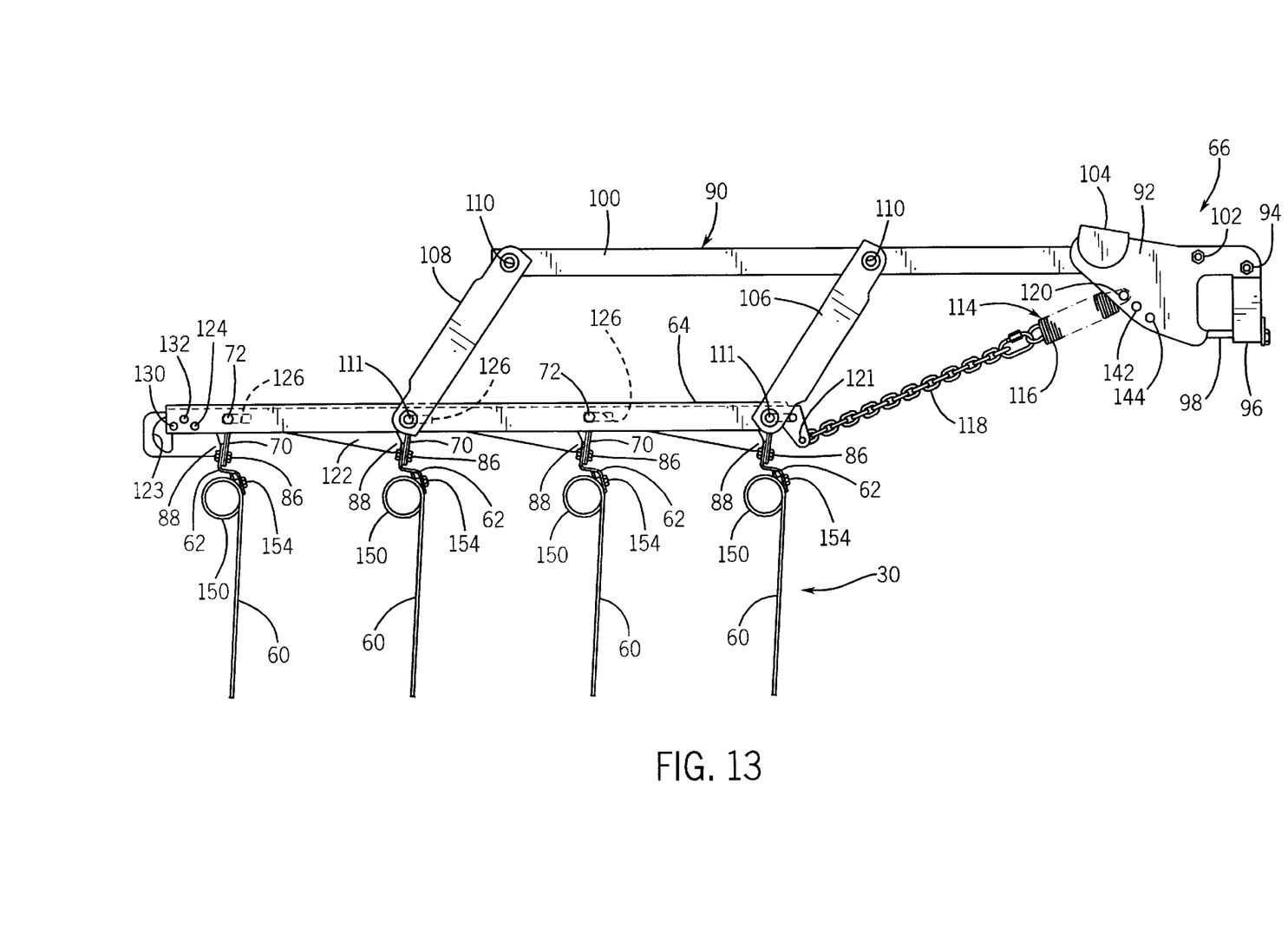
FIG. 13 is a side elevation view of the harrow section of FIGS. 4–6, illustrating a floating hitch mechanism and a rake angle adjust mechanism of the harrow section in first operational positions thereof.
Figure 14:
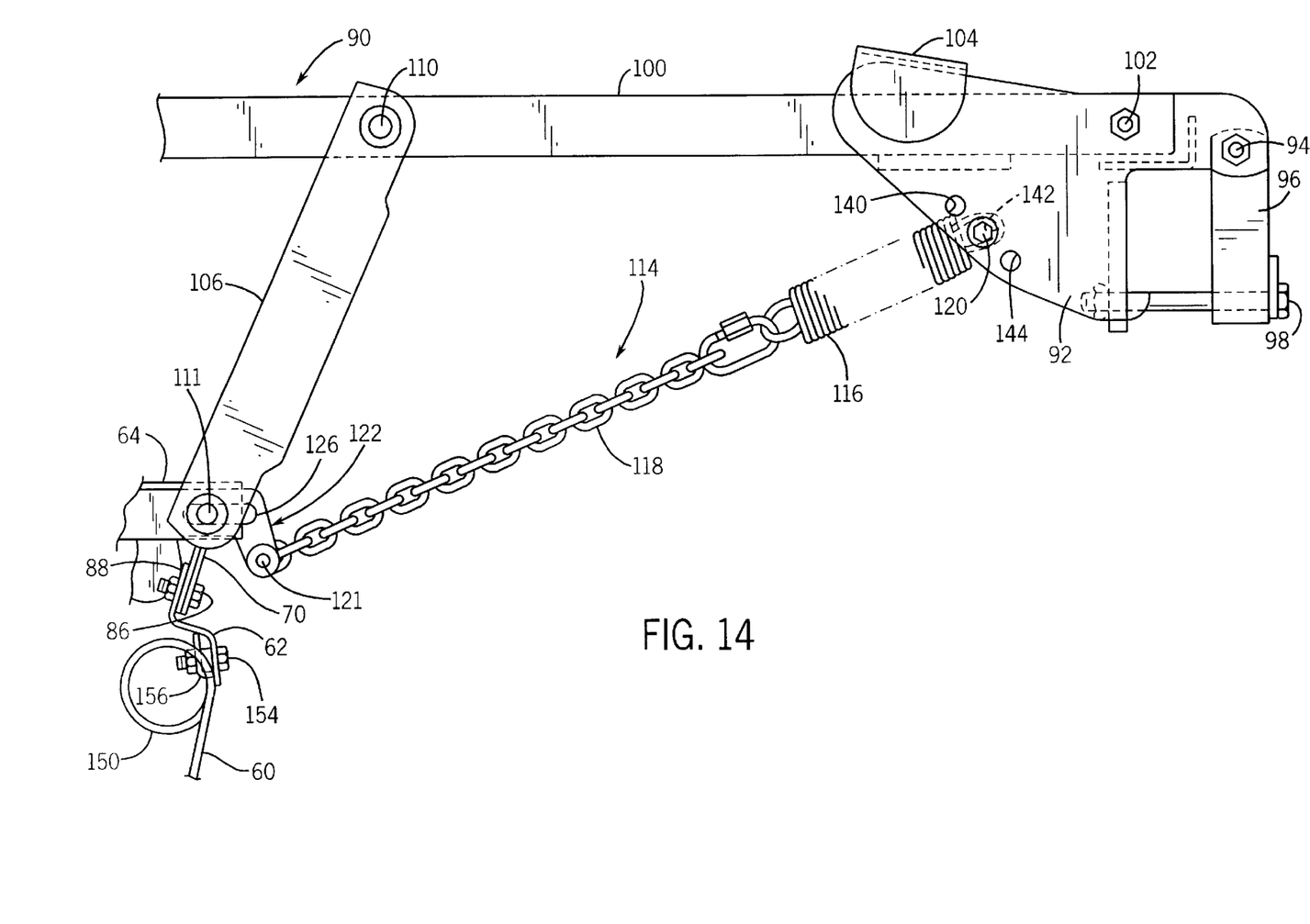
FIG. 14 is a side elevation view of a portion of the harrow section of FIGS. 4–6, illustrating the floating hitch mechanism and the tine rake angle adjust mechanism in second operational positions thereof.

Each floating hitch assembly includes a longitudinally extending tow arm 100 and the hitch 66. The hitch 66 takes the form of a bracket rigidly affixed to the cultivator 22. The tow arm is mounted on the bracket so as to be pivotable about a transversely extending, generally horizontal pivot axis. Referring to FIGS. 5, 13, and 14, each bracket of the preferred embodiment includes a pair of side plates 92 that are connected to one another by pins 94 so as to form a channel there between for receiving the end of the associated tow arm 100. The plates 92 are notched at their front ends to form an opening for receiving the drawbar of the cultivator 22. A clamp arrangement, including a clamp plate 96 and a clamp bolt 98, is movable into position after the opening engages the drawbar to rigidly clamp the hitch 66 to the drawbar.

Figure 15:
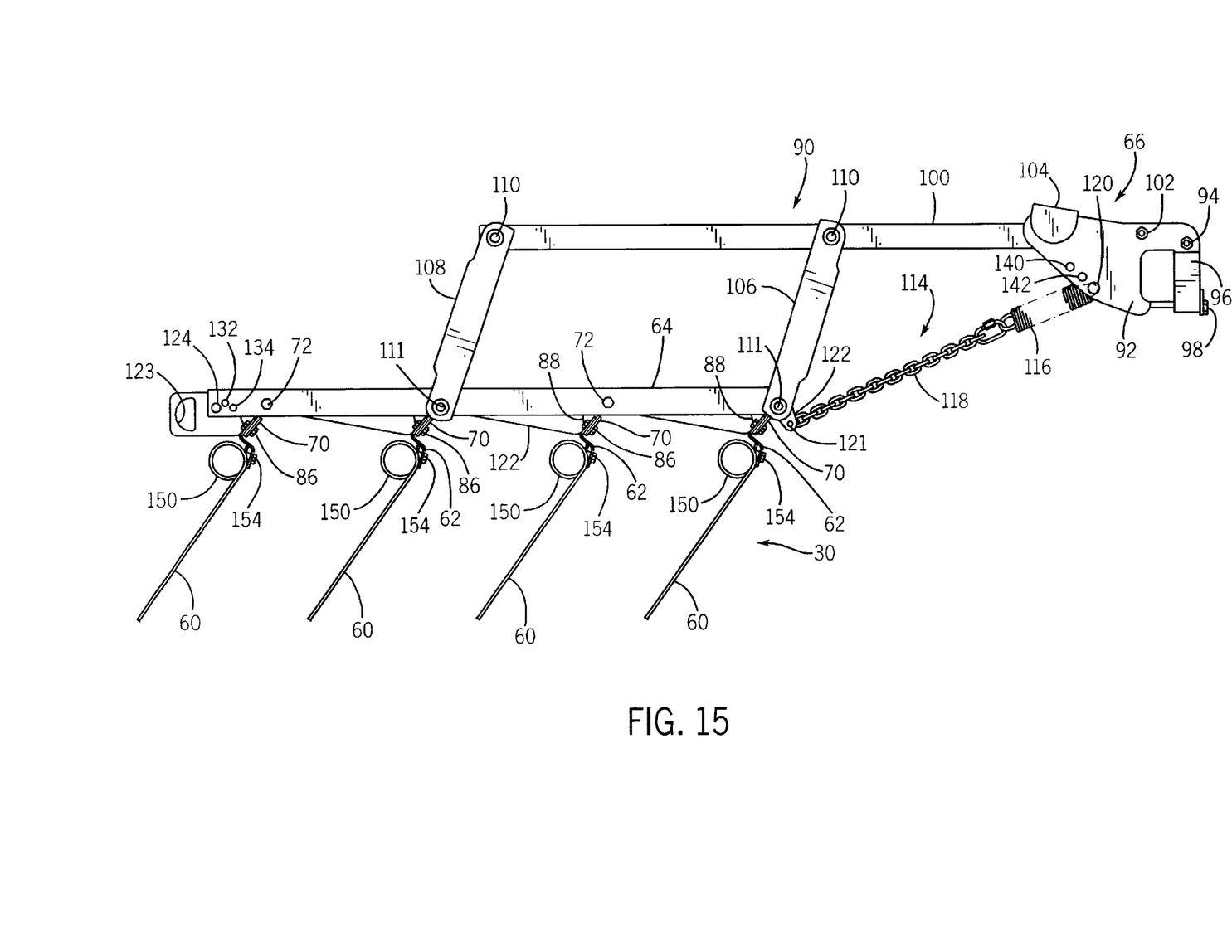
FIG. 15 is a side elevation view of the harrow section of FIGS. 4–6, illustrating the floating hitch mechanism and the tine rake angle adjust mechanism in third operational positions thereof.

Referring to FIG. 15, the tow arm 100 is pivotably connected to the hitch 66 by a pivot pin 102 extending through the side plates 92 and through the front end of the tow arm. Tow arm pivoting is limited by a channel member 104 that is welded or otherwise affixed to the top of the plates 92 so as to form a stop for the upper surface of the tow arm 100. The degree of tow arm pivoting movement or "float" permitted by the hitch 66 can be determined by, e.g., setting a desired inclination of the upper surface of the channel member 102 relative to the horizontal.

The parallelogram linkage assembly 90 couples the tow arm 100 to an underlying support arm 64 of the harrow section 30 so as to permit relative vertical movement between the support arm 64 and the tow arm 100 while retaining a parallel relationship therebetween. Preferably, the tow arm 100 and support arm 64 each form parts of the parallelogram linkage assembly 90, hence requiring only the use of two additional links 106 and 108 to complete the parallelogram linkage assembly. Two such links are provided, one at the front end of the support arm 64, and one at an approximate midpoint of the support arm. Referring to FIG. 5, each link 106 and 108 is generally C-shaped in transverse cross-section, with the center leg of the "C" being cut-out at its upper and lower ends so as permit unobstructed pivoting movement of the links 106, 108, tow arm 100, and support arm 64 relative to one another. The upper cut-outs form clevis mounts for pivotably coupling the upper ends of the links 106,108 to the tow arm 100 via upper pivot pins 110. The lower cut-outs form clevis mounts for pivotably coupling the lower ends of the links 106,108 to the support arms 64 via lower pivot pins 111. The pins 111 may double as hinge pins 72 if the holes in the links 106 and 108 properly align with the hinges 70.

Still referring to FIGS. 13–15, each harrow section 26, 28, 30 is biased downwardly against the ground by a pair of tensioner assemblies 114, one of which cooperates with each hitch 66. The tensioner assembly 114 includes a spring 116 that generates the biasing force and a chain 118 that transmits the biasing force of the spring 116 to an associated support arm 64 of the harrow section. The spring 116 is hooked to the chain 118 at its rear end and to a clevis pin 120 at its front end. The chain 118 is hooked to the spring 116 at its front end and to a pin 121 on a slide plate 122 of the rake angle adjust mechanism at its rear end.

The hitch 66 and parallelogram linkage 90, in combination, permit the harrow 24 to follow undulations in ground topography independently of the cultivator 22. In addition, if the harrow section (e.g., section 30) encounters obstructions such as logs or boulders as the implement 20 is traversing the field, the tow arms 100 of that section pivot relative to the hitch 66 to allow the harrow section 30 to move independently of the cultivator 22 while maintaining a parallel relationship between the harrow assembly and the tow arms 90. Variations in tow arm to ground spacing are accommodated by swinging of the tow arms 100 about the links 106 and 108 of the parallelogram linkage assembly 90 (compare FIG. 13 to FIG. 15), thereby maintaining a desired tine penetration depth and negating the need to adjust rake angle or some other aspect of harrow operation every time the operator changes cultivator height. This ability to float also maintains the tine penetration depth despite changes in cultivator penetration depth.

The automatic adjustment provided by the parallelogram linkage assembly 90 permits the tines 60 to continue to penetrate the ground even if the sweep 42 of the shank assembly 38 are raised just above the surface of the ground, as commonly occurs when the operator makes a turn at the end of a row. The harrow 24 therefore levels the tire tracks during a turning operation.

Figure 16:
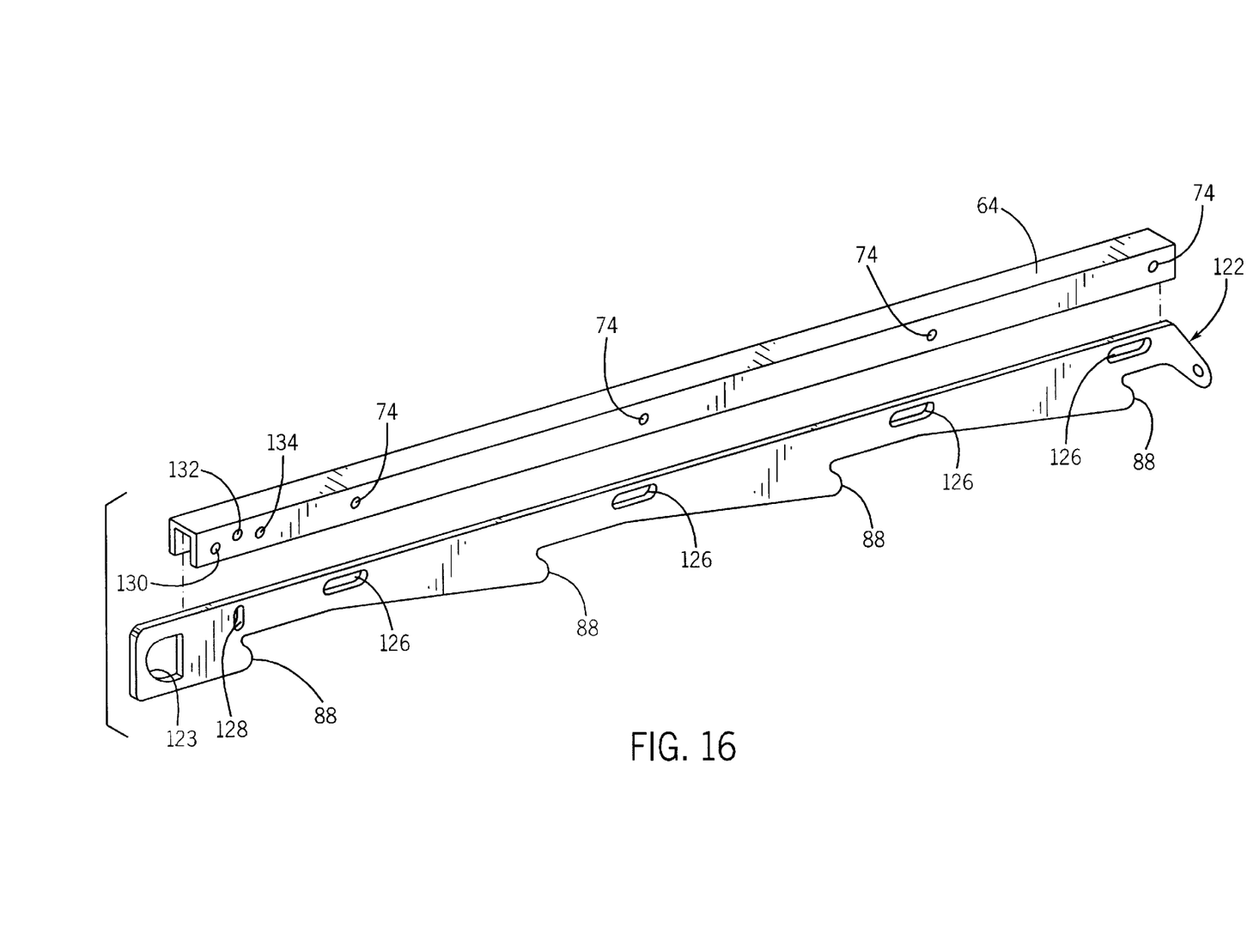
FIG. 16 is an exploded perspective view of the rake angle adjust mechanism.

As discussed briefly above, the rake angle of the tines 60 is determined by the engagement of the tine bars 62 with stops 88. This angle can be adjusted in a simple and convenient manner simply by moving the stops 88 longitudinally of the harrow section, hence varying the distance between the stops 88 and vertical planes containing the hinge pins 72. Conveniently, the rake angles for all rows can be adjusted simultaneously and uniformly through the actuation of a single tine slide on each of the support arms 64. As best seen in FIGS. 6 and 16, each tine slide comprises a unitary steel slide plate 122 extending through the channel formed by the associated n-shaped support arm 64. An access point is provided on the rear end portion of the slide plate 122 to facilitate power or manual actuation of the slide plate 122. In the illustrated embodiment, the access point comprises a handle 123 formed from an opening in a rear end portion of the slide plate 122. The handle 123 protrudes sufficiently beyond the rear end of the support arm 64 to provide manual access to the handle 123, even when the slide plate 122 is in its forward most position. The stops 88 are formed integrally with and extend downwardly from the remainder of the slide plate 122. The slide plate 122 is retained in the support arm 64 by the hinge pins 72 and by a clevis pin 124 located at the rear of the support arm 64. The hinge pins 72 extend through elongated slots 126 in the slide plate 122 so as to prevent vertical movement of the slide plate 122 relative to the support arm 64 while permitting relative longitudinally sliding movement therebetween. The clevis pin 124 extends through a rear hole 128 in the slide plate 122 and a selected one of a plurality (3 in the illustrated embodiment) of corresponding holes 130,132, and 134 in the support arm 64. Hence, the rake angle of all of the tines 60 on a given harrow section can be adjusted simply by removing the clevis pins of both slide plates 122, grasping the handles 123, and moving each slide plate 122 from a first position in which the hole 128 in the slide plate 122 is aligned with one of the holes 130,132, or 134 in the support arm 64 to a second position in which the hole is aligned with another hole 130,132, or 134 in the support arm 64. The clevis pin 124 is then reinserted through the aligned holes to lock the slide plate 122 in its adjusted position.

The connection point of the spring tensioner assembly 114 to at least one of the hitch 66 and the slide plate 122 preferably is adjustable to maintain a constant tension on the harrow assembly despite movement of the slide 122 relative to the hitch 66 during a rake angle adjustment operation. In the illustrated embodiment, this adjustment is made possible by providing several mounting holes 140, 142, 144 on the hitch plates 92 receiving the clevis pin 120 for the spring 116. The number of holes in the hitch plates 92 preferably equals the number of holes in the support arm 64 for receiving the clevis pin 124. In the illustrated embodiment, the clevis pin 120 is placed in the upwardmost hole 140 in the hitch plates 92 when the slide plate 122 is in its forwardmost position as seen in FIG. 13, in the intermediate hole 142 when the slide plate 122 is placed in its central position as seen in FIG. 14, and is in the lowermost hole 144 when the slide plate 122 is in its rearward most position as seen in FIG. 15.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above, but rather is intended to be limited only by the claims set out below. Thus, the invention encompasses all alternate embodiments that fall literally or equivalently within the scope of these claims.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tine harrow assembly having a frame member; a plurality of tines pivotally connected to said frame member to permit a rake angle adjustment of said tines, said tines being arranged in a plurality of transversely extending rows; and an adjustment mechanism operably connected to said tines for effecting a change in said rake angle, the improvement comprising:

said adjustment mechanism including a tine slide having a stop formed therein corresponding to each said transverse row of tines, said tine slide being moveable relative to said frame to position said stops at one of multiple selected positions, said transverse rows of tines being pivotable against the corresponding stops to define a selected rake angle;

said tine slide comprises a slide plate slidably mounted on a longitudinally-extending support member of said harrow assembly, said slide plate being attachable to said support member at any one of multiple mounting points along said support member, wherein the number of mounting points equals the number of stop positions;

said slide plate includes an access point for applying actuating forces to said slide plate;

said access point comprises a manually-accessible handle;

said stops are formed integrally with said slide plate; and a tensioner that is coupled to said tine slide and to a support for said frame member and that tensions said tine harrow assembly downwardly and forwardly.

2. The tine harrow assembly of claim 1, wherein said support has a multiple tensioner attachment points corresponding in number to the number of stop positions, and wherein said tensioner is moveable between said attachment points so as to maintain application of a generally constant tensioning force against said harrow assembly regardless of tine slide.

3. The tine harrow assembly of claim 2, wherein said support comprises a hitch of a harrow section of which said tine harrow assembly is a part.

4. A tine harrow assembly comprising:

a frame member;

a plurality of tines pivotally connected to said frame member o permit a rake angle adjustment of said tines, said tines being arranged in a plurality of transversely extending rows;

an adjustment mechanism operably connected to said tines for effecting a change in said rake angle, said adjustment mechanism including a tine slide having a stop formed therein corresponding to each sad transverse row of tines, said tine slide being moveable relative to said frame to position said stops at one of multiple selected positions, said transverse rows of tines being pivotable against the corresponding stops to define a selected rake angle;

wherein said tine slide comprises a slide plate slidably mounted on a longitudinally-extending support member of said harrow assembly, said slide plate being attachable to said support member at any one of multiple mounting points along said support member, wherein the number of mounting points equals the number of stop positions;

said slide plate includes an access point for applying adjustment forces to said slide;

said access point comprises a manually-accessible handle;

said stops are formed integrally with said side plate; and a tensioner that is coupled to said tine slide and to support for said frame member an that tensions said tine harrow assembly downwardly and forwardly.

5. The tine harrow assembly of claim 4, wherein said support has a multiple tensioner attachment points corresponding in number to the number of stop positions, and wherein said tensioner is moveable between said attachment points so as to maintain application of a generally constant tensioning force against said harrow assembly regardless of tine slide position.

6. The tine harrow assembly of claim 5, wherein said support comprises a hitch of a harrow section of which said tine harrow assembly is a part.

7. A tillage implement comprising:

a hitch adapted for connection to a prime mover;

a cultivator section mounted to said hitch;

a tine harrow assembly connected to said cultivator to said cultivator section in trailing relationship thereto;

a bracket rigidly affixed to said cultivator;

a pivot pin carried by said bracket to define a transversely extending, generally horizontal pivot axis, said tine harrow assembly being pivotally connected to said bracket via said pivot pin to permit generally vertical floating movement of said tine harrow assembly can follow ground undulations independently of said cultivator section; wherein said tine harrow assembly includes a four bar linkage pivotably connected to said bracket by said pivot pin, said linkage permitting said tine harrow assembly to move vertically while maintaining a parallel relationship;

said bracket includes a stop member cooperable with said four bar linkage to limit the floating movement of said linkage relative to said bracket; and said bracket is formed with a pair of laterally spaced side plates, said stop member being a channel member bridging said side plates above spaced linkage.

* * * * *